June 27, 1967    J. W. BEGLEY ETAL    3,328,480
SEPARATION OF DIOLEFINS FROM A REACTION EFFLUENT
Filed Dec. 31, 1962
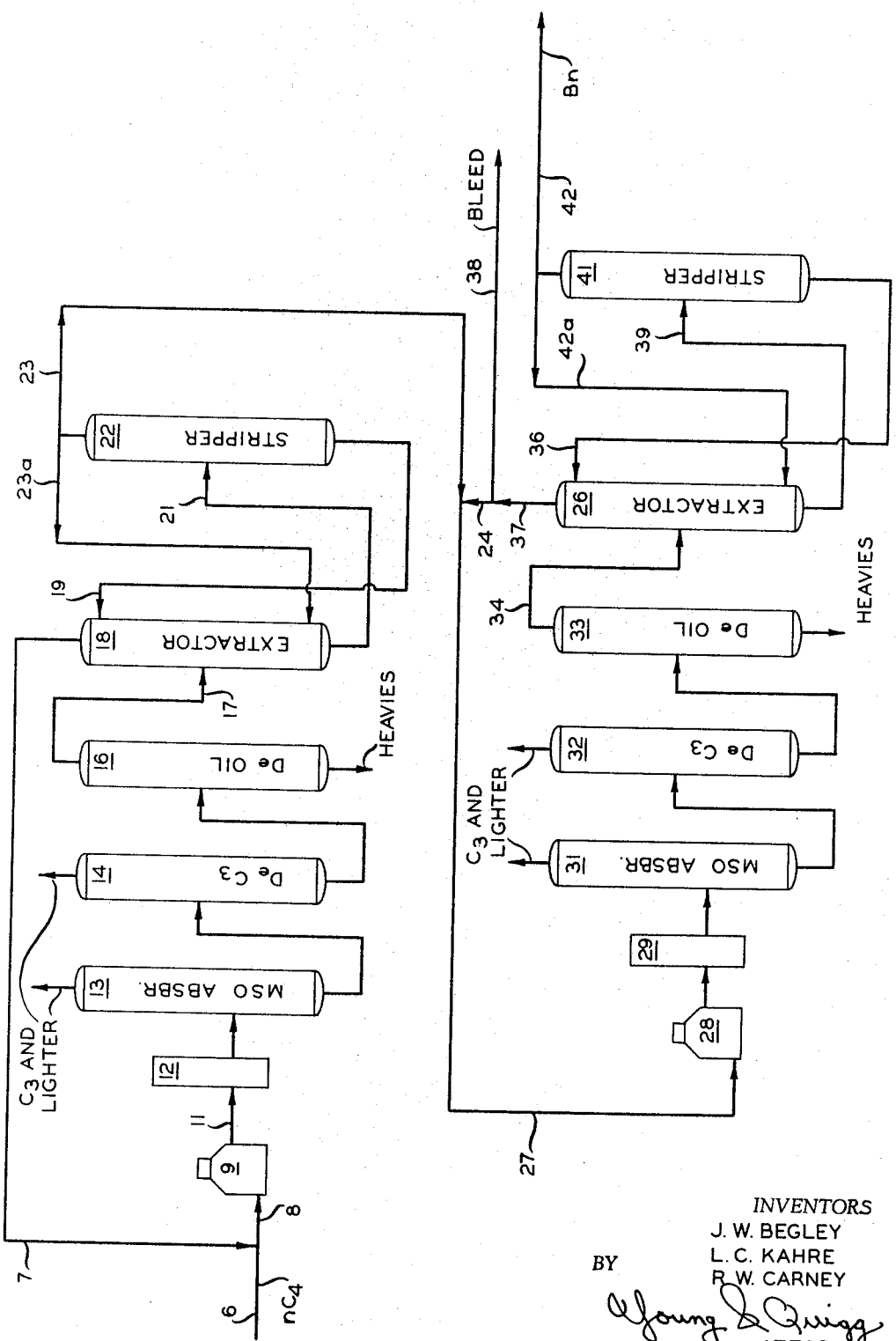
INVENTORS
J. W. BEGLEY
L. C. KAHRE
R. W. CARNEY
BY
*Young & Quigg*
ATTORNEYS

United States Patent Office 3,328,480
Patented June 27, 1967

3,328,480
SEPARATION OF DIOLEFINS FROM A REACTION EFFLUENT
John W. Begley, Le Roy C. Kahre, and Richard W. Carney, Bartlesville, Okla., assignors to Phillips Petroleum Company, a corporation of Delaware
Filed Dec. 31, 1962, Ser. No. 248,773
8 Claims. (Cl. 260—681.5)

This invention relates to the separation of hydrocarbons using liquid-liquid extraction. In another aspect it relates to an improvement in the liquid-liquid extraction procedures employed in the separation of butadiene-1,3 from admixture with butanes, butenes, and acetylenes.

The dehydrogenation of hydrocarbons produces complex mixtures of hydrocarbons. For example, the dehydrogenation of paraffin hydrocarbons produces a mixture of olefins, diolefins and paraffin hydrocarbons. It is, of course, necessary to resolve these mixtures into their various components in order to utilize such components. Thus, the diolefins are valuable for the preparation of synthetic rubber, olefins are valuable for production of polymers and also for the production of diolefins, and paraffins are valuable for the production of both olefins and diolefins as well as for other uses. Efficient fractional distillation of such complex hydrocarbon mixtures ordinarily requires a great number of distillation steps, and also requires some very close fractional distillation procedures in order to segregate the individual components which go to make up the mixture. It is common practice to use absorption procedures in connection with the fractional distillation procedures in segregating the components which make up the above-referred to hydrocarbon mixtures.

In one process for the production of butadiene, normal butane is catalytically dehydrogenated to form a mixture of unsaturated hydrocarbons in combination with unreacted normal butane. This mixture is resolved to recover butadiene which has been formed in the dehydrogenation process, and also to separate and recover butenes which have resulted from the dehydrogenation step.

Several processes have been proposed for the segregating and purification of butadiene and one of the more successful processes is disclosed in U.S. Patent 2,415,006, issued to K. H. Hackmuth, Jan. 28, 1947. In the above-referred to systems the segregation process steps are directed to the purification and recovery of butadiene. The streams resulting from the process which contain $C_4$ hydrocarbons other than butadiene are recycled to the dehydrogenation steps, or are discarded from the system.

Numerous solvents have been tried and/or used in extractive distillation and liquid extraction processes, such as furfural and methyl carbitol as showing selectivity for certain groups of hydrocarbons over others, but all have not been completely satisfactory.

It is, therefore, an object of this invention to provide an efficient process for liquid-liquid extraction of diolefins from a hydrocarbon mixture containing the same. It is another object to provide a novel solvent selective for diolefins present in a hydrocarbon mixture.

It is still another object to provide a solvent mixture having superior selectivity for diolefins, and improved solubility characteristics to permit separation of the resulting diolefin-rich solvent.

Other aspects, objects and advantages of this invention will become apparent from a study of the disclosure, the drawing and the appended claims to the invention.

According to the present invention, there is provided an improved process and novel mixed solvent for use therein for separating diolefins from hydrocarbon mixture containing the same, such as dehydrogenation effluent, by countercurrently contacting said effluent with said solvent comprising a major portion of propylene carbonate and a minor portion of ethylene carbonate in a volume sufficient to selectively extract substantially all of said diolefin from said effluent, passing the resulting extract to a stripping zone wherein the diolefin is stripped therefrom. The stripped mixed solvent is usually returned to the liquid-liquid extraction step for reuse.

Referring now to the drawing, a normal $C_4$ containing feed is passed via conduit 6, joined by recycle conduit 7, to form combined feed stream 8 to a heater 9. The effluent 11 from the heater passes successively through a dehydrogenation zone 12; a mineral seal oil absorber 13, from which $C_3$ and lighter hydrocarbons are vented overhead; a depropanizer 14, and a deoiler zone 16, from the bottom of which heavies are withdrawn to disposal.

Thus, a normal butane-containing stream 17, also containing some butadiene, butene-1, butene-2, is introduced onto tray 32, numbering upwardly from the bottom of a 70-tray column 18. The mixed solvent of this invention is introduced from stream 19 onto the topmost tray of extractor 18. A liquid-liquid extraction is conducted in extractor 18, and the raffinate therefrom comprises the composition of stream 7, which is recycled to the dehydrogenation step.

The butenes-rich solvent resulting from the extraction further comprising butene-1, butenes-2, isobutylene, and butadiene is withdrawn via conduit 21 and is passed to a stripper 22, wherein heat is added.

The hydrocarbons dissolved in the mixed solvent are removed as overhead product via conduit 23 and passed to a second stage heater. Part of stream 23 is recycled into the lower portion 23a of extractor 18 to reflux the same. Lean mixed solvent is removed from the bottom of stripper 22 as stream 19 into absorber 18.

Stream 23 is joined by overhead stream 24 from a second extractor 26.

Combined feed stream 27 passes to a second heater 28. The effluent from the heater passes successively through a dehydrogenation zone 29; a Mineral Seal Oil absorber 31, from which $C_3$ and lighter hydrocarbons are vented overhead; a depropanizer 32; and a deoiler zone 33, from the bottom of which heavies are withdrawn to disposal.

A butadiene-rich effluent 34 is introduced onto tray 32 of a second 70-tray column 26. The mixed solvent of this invention is introduced from stream 36 onto the topmost tray of extractor 26. A liquid-liquid extraction is conducted in extractor 26, and the raffinate therefrom comprises the composition of stream 37, which is recycled via conduits 24 and 27. Conduit 38 is a butene bleed stream.

The butadiene rich solvent resulting from the extraction further comprising traces of butenes is withdrawn via conduit 39 and is passed to a stripper 41, wherein heat is added. The desired butadiene extract is removed as overhead product via conduit 42 and passed to storage facilities, or the like. A small portion 42a of this stream is recycled into the lower portion of extractor 26 as reflux. Lean mixed solvent is removed from the bottom of stripper 41 as stream 36 and passed into extractor 26. Both extractors 18 and 26 operate at about 100° F.

The total solvent circulation rate to the extractor feed rate is in the range of ratios from 8:1 up to 30:1.

Cyclic organic carbonates are cyclic esters represented by the general formula:

(a)

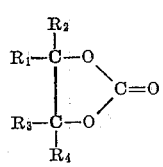

and (b)

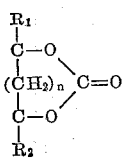

wherein $R_1$, $R_2$, $R_3$, and $R_4$ are hydrogen or alkyl or alkenyl groups and $n$ is a whole number from 3 to 4. In the case of ethylene carbonate, all the R's in formula (a) are hydrogen atoms. In the case of propylene carbonates, all the R's but one are hydrogen, and that one is a methyl group. Other cyclic organic carbonates which may be combined in various ratios to provide a mixed solvent for the purposes of this invention include butene carbonates, allene carbonates, cyclopentene carbonate, cyclohexene carbonate, and butadiene dicarbonate. The ratio of the higher molecular weight carbonate to the lower molecular weight carbonate in the novel mixed solvent should be greater than one, and preferably in the range of 1.5:1 to 4:1.

By varying this ratio of the carbonates in the novel mixed solvent, the solubility of the hydrocarbon in the solvent can be adjusted to fit a particular hydrocarbon system under study.

The equilibrium data for these systems was obtained by the following method:

(A) The solvent and hydrocarbon mixture (butene+butadiene) was charged to a container suitable to allow heating under the hydrocarbon vapor pressure.

(B) The system was heated to the desired temperature and the temperature held constant while the two liquid phases were contacted (by stirring) until equilibrium was attained.

(C) The stirrer was turned off and the two liquid phases allowed to separate (by difference in density).

(D) Both phases were sampled and analyzed by distillation and mass spectrometry for solvent content and for each of the two hydrocarbons content.

(E) The solvent circulation in the extractor is set by the solubility of the total hydrocarbon in the solvent phase. This solubility was measured by distilling the hydrocarbon from the solvent phase sample, and collecting and weighing the recovered hydrocarbon.

(F) This recovered hydrocarbon was analyzed for butadiene and butene-1 with a mass spectrometer.

(G) The hydrocarbon-rich phase was analyzed in like manner. The dissolved solvent was removed by distillation and the hydrocarbon recovered was analyzed with the aid of a mass spectrometer.

(H) The selectivity ($\beta$) of a given solvent for butadiene over butene-1 is obtained from the following equation:

$$\beta = \frac{X_{BnE}}{X_{BnR}} \cdot \frac{X_{B1R}}{X_{B1E}}$$

where:

$X_{BnE}$=Butadiene concentration in solvent phase
$X_{B1E}$=Butene-1 concentration in solvent phase
$X_{BnR}$=Butadiene concentration in hydrocarbon phase
$X_{B1R}$=Butene-1 concentration in hydrocarbon phase.

All concentrations are on a solvent-free basis.

The following Table I compares the characteristics of several candidate solvents for separation of a butenes-butadiene system, as measured in terms of solvent selectivity, theoretical stages, and solvent circulation rate.

| Candidate Solvent (Parts by Weight) | Temperature, °F. | Selectivity | Theoretical Stages | Solvent Rate, MM lbs./hr. |
|---|---|---|---|---|
| Methyl Carbitol (85), H₂O (15) | 100 | 1.39 | 53 | 0.69 |
| Ethylene Diamine (95), H₂O (5) | 100 | 1.57 | 47 | 0.55 |
| Furfural (100) [1] | 156 | 1.28 | 40 | 2.25 |
| Propylene Carbonate (70), Ethylene Carbonate (30) | 100 | 1.75 | 36 | 0.40 |
| Propylene Carbonate (100) [2] | 100 | 1.73 | | |

[1] Data from extractive distillation.
[2] Propylene carbonate alone as a solvent is completely miscible with the hydrocarbon system, which precludes necessary phase separation in the solvent strippers.

The superiority of the propylene carbonate-ethylene carbonate mixed solvent of this invention is clearly demonstrated in the above data.

At the pressure existing in the stripping column, the alkylene carbonates boil at extremely high boiling points. While it may be possible to separate the solvent from the hydrocarbon by simple distillation, this is not desirable due to possible decomposition of the solvent. Therefore, in order to reduce the kettle temperature required to effect boil up, the stripper may be operated under vacuum; or more preferably, a stripping agent, such as cyclohexane or heptane may be added to the stripper kettles.

*Example*

Following is an example of our invention. The flowing stream quantities are not to be deemed unduly limitative of the scope of our invention. Extractors 18 and 26 operate at about 100° F. top pressure of 70 p.s.i. and bottom pressure of 120 p.s.i., which is sufficient to maintain two liquid phases.

The effect of column operating conditions and of heat input and removal via the process streams, upon the compositions of the product stream is known in the prior art, so that a compatible set of operating parameters may be determined by conventional chemical engineering calculation techniques. Table II describes a material balance for a typical separation.

TABLE II
[Mols per hour]

| | Fresh nC₄ Feed | Butane Dehydrogenation | | | Butenes Purification Solvent | Butenes Dehydrogenation | | | | | Solvent | Butadiene Purification | | | Product Butadiene |
|---|---|---|---|---|---|---|---|---|---|---|---|---|---|---|---|
| | | Recycle | Feed | Effluent | | Extract | Recycle | Recycle | Feed | Effluent | | Raffinate | Butene Bleed | Extract | |
| Stream Number | 6 | 7 | 8 | 17 | 19 | 21 | 23 | 24 | 27 | 34 | 36 | 37 | 38 | 39 | 42 |
| COMPONENT | | | | | | | | | | | | | | | |
| Isobutane | 6 | 9 | 15 | 9 | 0 | 0 | 0 | 0 | 0 | 0 | 0 | 0 | 0 | 0 | 0 |
| Normal Butane | 991 | 1,465 | 2,456 | 1,474 | 0 | 54 | 9 | 149 | 158 | 153 | 0 | 153 | 0 | 0 | 0 |
| Isobutylene | 0 | 0 | 0 | 5 | 0 | 30 | 5 | 185 | 190 | 190 | 0 | 190 | 4 | 0 | 0 |
| Butene 1 | 3 | 5 | 8 | 255 | 0 | 1,498 | 250 | 740 | 990 | 758 | 0 | 757 | 5 | 0 | 0 |
| Trans Butene 2 | 0 | 5 | 5 | 254 | 0 | 1,492 | 249 | 656 | 905 | 671 | 0 | 670 | 17 | 30 | 1 |
| Cis Butene 2 | 0 | 5 | 5 | 254 | 0 | 1,492 | 249 | 656 | 905 | 671 | 0 | 670 | 14 | 30 | 1 |
| Butadiene | 0 | 0 | 0 | 79 | 0 | 473 | 79 | 21 | 100 | 600 | 0 | 22 | 14 | 30 | 1 |
| Solvent ¹ | 0 | 0 | 0 | 0 | 30,000 | 30,000 | 0 | 0 | 0 | 0 | 22,000 | 0 | 1 | 17,600 | 578 |
| Total | 1,000 | 1,489 | 2,489 | 2,330 | 30,000 | 35,039 | 841 | 2,407 | 3,248 | 3,043 | 22,000 | 2,462 | 55 | 39,690 | 581 |

¹ 70% Propylene Carbonate, 30% Ethylene Carbonate.

NOTE.—Gross extract streams 21 and 39 include extractive reflux streams which are not included separately in the above table.

Reasonable variations and modifications are possible within the scope of the foregoing disclosure, the drawing and the appended claims.

We claim:

1. A process which comprises contacting a hydrocarbon mixture with a solvent mixture in an extraction zone, said hydrocarbon mixture comprising paraffin, olefin, and diolefin hydrocarbons, said solvent mixture comprising a major portion of propylene carbonate and a minor portion of ethylene carbonate in a volume sufficient to selectively extract substantially all of said diolefins from said hydrocarbon mixture, and under pressure sufficient to maintain two liquid phases within said extraction zone, and passing the resulting extract to a stripping zone wherein the diolefin content in stripped therefrom.

2. The process of claim 1 wherein the ratio of propylene carbonate to ethylene carbonate in said solvent mixture is in the range of 1.5:1 to 4:1.

3. A process of extracting butadiene from a hydrocarbon mixture which comprises contacting a hydrocarbon mixture with a solvent mixture in an extraction zone in a volume sufficient to selectively extract substantially all of said butadiene from said mixture, said hydrocarbon mixture consisting essentially of butane, butenes, and butadiene hydrocarbons, said solvent mixture consisting essentially of propylene carbonate and ethylene carbonate in the range of 1.5:1 to 4:1, under pressure sufficient to maintain two liquid phases within said extraction zone, and passing the resulting extract to a stripping zone wherein the butadiene content is stripped therefrom.

4. The process of claim 3 to include recycling the stripped mixed solvent from said stripping zone to said extraction zone.

5. A process which comprises passing a hydrocarbon feed mixture to a first fractionation distillation step to remove $C_3$ and lighter materials as an overhead product, said hydrocarbon feed mixture comprising paraffin, olefin and diolefin hydrocarbons, subjecting the remaining hydrocarbons without further treatment to a second fractional distillation step to remove $C_5$ and heavier hydrocarbons as a kettle product; subjecting the now remaining hydrocarbons to a liquid-liquid extraction step by countercurrently contacting them with a solvent comprising a mixture of a major portion of propylene carbonate and a minor portion of ethylene carbonate in a volume sufficient to selectively extract diolefins present in said hydrocarbon feed mixture, maintaining two liquid phases within said extraction zone; and subjecting the rich solvent to a stripping step for removal of absorbed diolefins.

6. A process which comprises passing a hydrocarbon feed mixture to a first fractional distillation step to remove $C_3$ and lighter materials as an overhead product, said hydrocarbon feed mixture consisting essentially of paraffin, butene, and butadiene hydrocarbons; subjecting the remaining hydrocarbons without further treatment to a second fractional distillation step to remove $C_5$ and heavier hydrocarbons as a kettle product; subjecting the now remaining hydrocarbons to a liquid-liquid extraction step by countercurrently contacting them with a solvent comprising a mixture of a major portion of propylene carbonate and a minor portion of ethylene carbonate in the range of 1.5:1 to 4:1, respectively, maintaining two liquid phases within said extraction zone; and subjecting the rich solvent to a stripping step for removal of adsorbed butadiene.

7. A process which comprises contacting a hydrocarbon feed mixture comprising olefin and diolefin hydrocarbons in an extraction zone with a solvent mixture in a volume sufficient to selectively extract substantially all of said diolefins from said mixture, and under pressure sufficient to maintain two liquid phases in said extraction zone, said solvent mixture consisting essentially of a major portion of propylene carbonate and a minor portion of ethylene carbonate, and passing the resulting extract to a stripping zone wherein the diolefin content is stripped therefrom.

8. The process of claim 7 wherein the ratio of propylene carbonate to ethylene carbonate in said solvent mixture is in the range of 1.5:1 to 4:1.

References Cited
UNITED STATES PATENTS

| 2,688,645 | 9/1954 | Baderscher et al. | 208—325 |
| 2,750,435 | 6/1956 | Fetchin | 260—680 |
| 2,837,585 | 6/1958 | Murray et al. | 208—325 |
| 2,963,522 | 12/1960 | Cobb | 260—680 |
| 3,018,228 | 1/1962 | Cornell | 260—669 |
| 3,050,573 | 8/1962 | Anderson et al. | 260—681.5 |

PAUL M. COUGHLAN, JR., *Primary Examiner.*